United States Patent Office 2,910,835
Patented Nov. 3, 1959

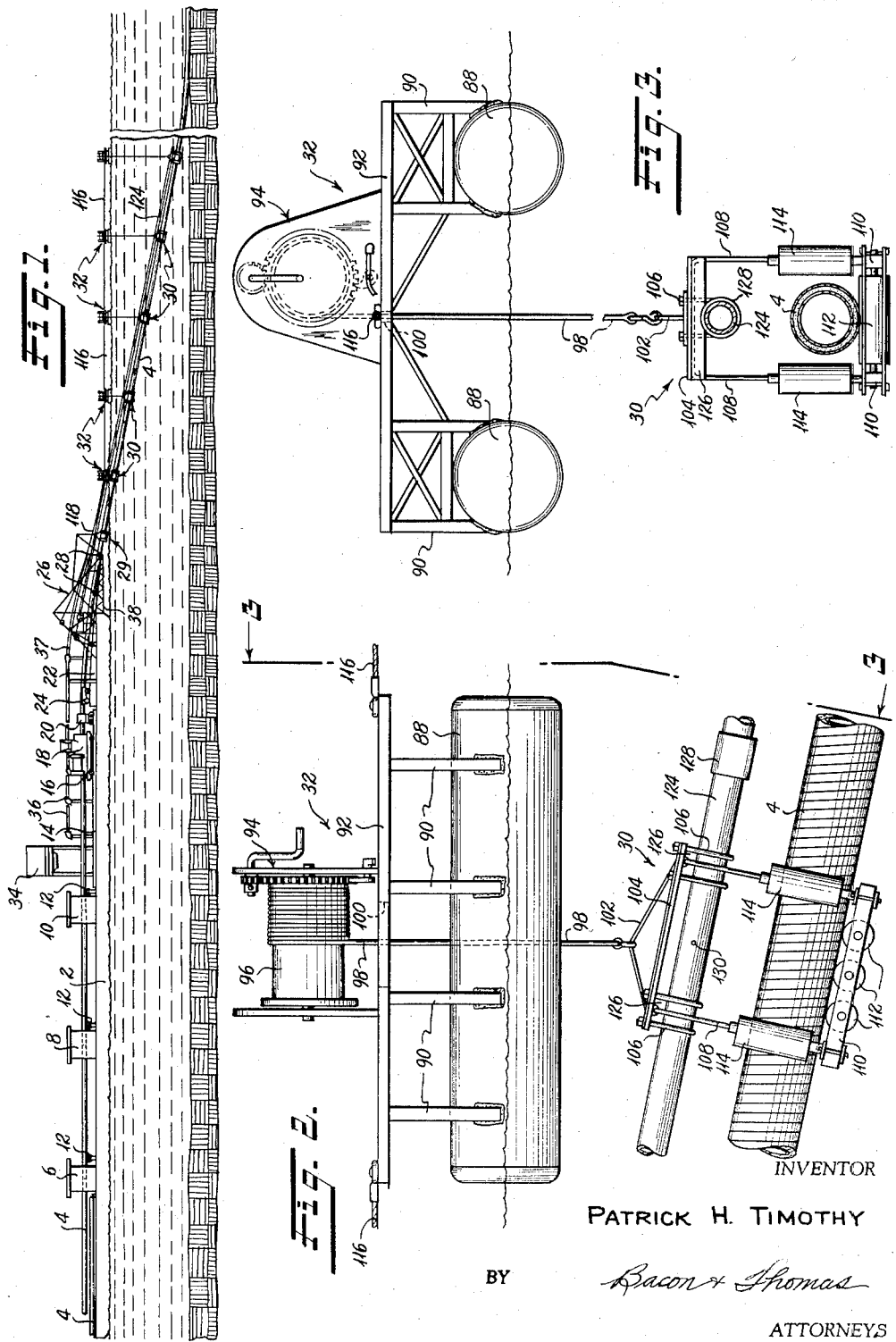

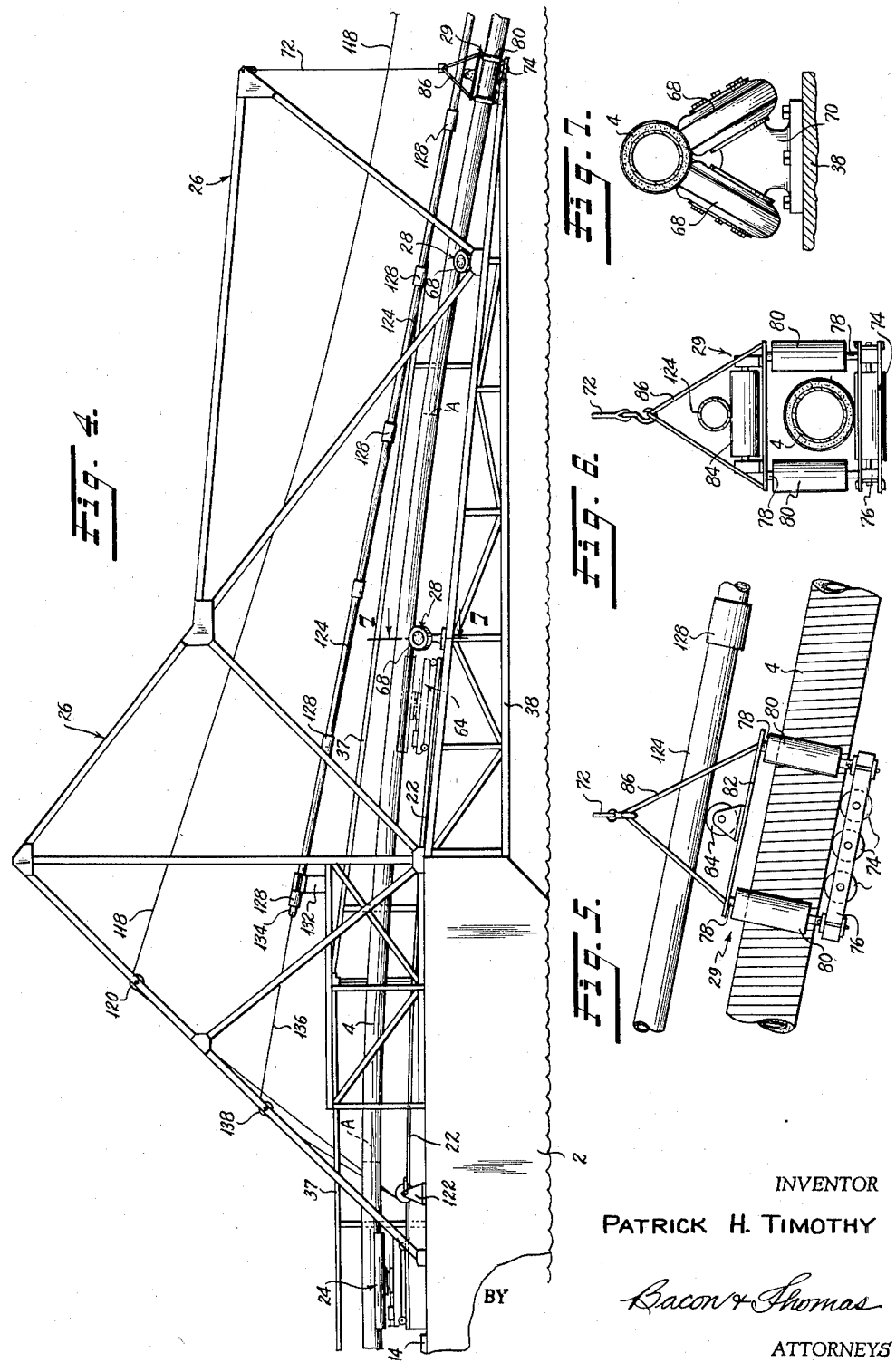

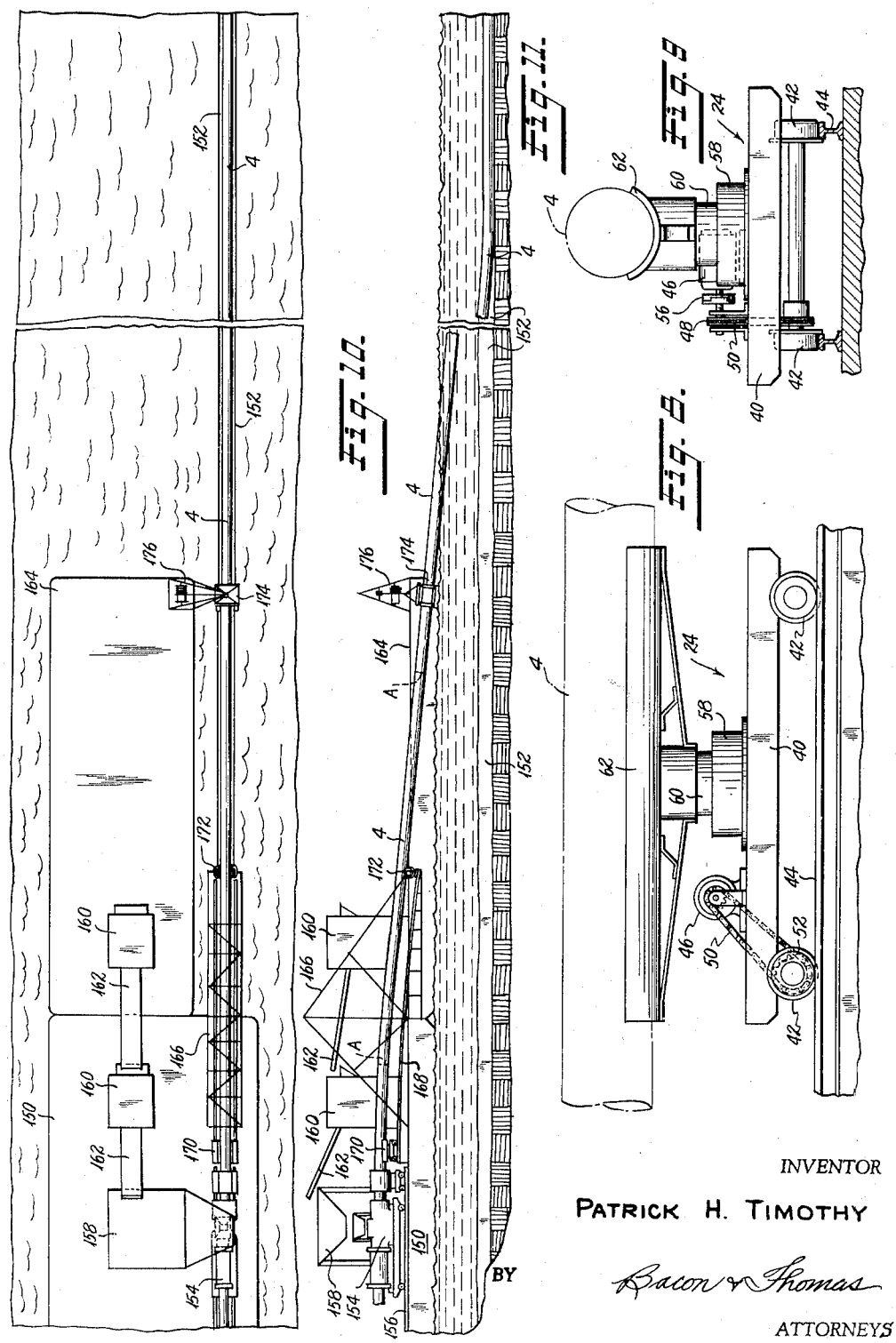

2,910,835

PIPE LAYING APPARATUS AND METHOD

Patrick H. Timothy, New Orleans, La., assignor, by mesne assignments, of one-half to Southern Natural Gas Company, Birmingham, Ala., a corporation of Delaware, and one-half to Brown & Root, Inc., Houston, Tex., a corporation of Texas Application April 26, 1955, Serial No. 504,066

9 Claims. (Cl. 61—72)

This invention relates to apparatus and method for lowering and laying a continuous pipeline as individual joints thereof are added to an end of said pipeline. The invention relates particularly to the lowering and laying of such a pipeline a substantial distance below the level of assembly of the individual joints into the continuous pipe.

While the specific description herein and the drawings relate to the assembly of a continuous length of pipe on a barge floating on a body of water and to the application of a heavy coating of flexible material to the pipe, that reference and description is merely for the purpose of illustration, it being understood that many of the features of the present invention are adaptable to the laying of pipelines having other coatings than that referred to and for the laying of pipelines, with or without coatings, on land from wheeled vehicles.

In recent years there has been increasing activity in the offshore drilling of oil and gas wells which has created a need for pipelines extending from the offshore sites to shore installations for carrying oil and/or gas.

The need for such pipelines has long been recognized but their realization has been beset by many problems. For instance, pipelines laid under water and particularly in saline waters, must be adequately protected against corrosion by anti-corrosion coatings which must in turn be protected from penetration by marine organisms and damage by other destructive forces. Furthermore, the laying of even steel pipe in water requires that the pipe be heavy enough to sink to the bottom and remain stable against the action of disturbing influences. The larger sizes of pipes, even though made of steel, are still so buoyant when laid in water that they float rather than sink to the bottom. It is obvious that some means must be provided for sinking such pipes and holding them in stable position on or below the bottom of the body of water.

Heretofore pipelines have been laid under the conditions referred to wherein the lengths of steel pipe were welded to a continuous length as the laying proceeded but were provided with either a heavy continuous coating of reinforced concrete sufficiently thick to provide the required weight or were provided with spaced weight collars or clamps that had to be individually secured to the pipe before the same was lowered below the surface of the water.

The lowering of such pipeline into the water from an upper position of assembly necessitates some bending of the pipe, whether it be coated or not. Pipes coated with concrete or other similar brittle coatings are relatively fragile and must be handled with extreme care, taking great pains to avoid bending beyond certain limits to avoid cracking of the coating and its loss completely from the pipe which would not only endanger the stability of the pipeline but would expose the corrosion protection coating to attack by marine organisms. The concrete coating thus serves the dual purpose of a weight coating as well as a shield to the anti-corrosion coating from penetration by marine organisms.

For example, an uncoated steel pipeline of 16 inches outside diameter may be bent to a minimum radius of substantially less than 400 feet without exceeding the elastic limit of the steel. On the other hand, the same pipeline coated with concrete of a thickness necessary to provide the desired weight cannot be bent to a radius of curvature less than about 2,000 feet without cracking and damaging the concrete coating. When water enters the cracked coating the concrete soon spalls off the pipe due to the rapid corrosion of the thin wire reinforcement at the center of the coating. The disintegration of the concrete thus exposes the corrosion protection under coatings to penetration by marine organisms and the pipe itself to failure due to the corrosion of the steel.

Thus, the lowering of concrete coated pipe necessitates supporting the curved portions for a very substantial distance rearwardly of the point where it begins to curve downwardly into the water and the length and size of available equipment limits the distance at which such pipe can be supported and it has been found that concrete coated pipe cannot be successfully laid in waters exceeding 12 to 18 feet in depth when exposed to wave action. Even in waters of a depth within that range, wave action acting on the pipe further tends to flex the pipe and further limits the success of such an operation.

The present invention relates particularly to apparatus and method for lowering pipelines and controlling the flexure of a pipeline being lowered and offers means for positively controlling the radius of curvature so that it may be maintained within the necessary limits.

This invention also relates to the lowering of a pipeline coated with a particular heavyweight coating that is sufficiently flexible so that the pipe may be bent to any radius permitted by the steel itself without endangering continuity of the coating material. Applicant has developed a coating composition comprising a bituminous mastic consisting of a heat-responsive binder such as asphalt or the like, a filler of heavy aggregate material and fiber reinforcing material such as glass fibers. The aggregate may be crushed barium sulfate ore or ilmenite (iron-titanium ore). This coating composition and pipe coated therewith are fully described and claimed in applicant's now abandoned application Serial No. 491,834, filed on March 3, 1955 and entitled "Pipe Coating Composition and Coated Pipe." Reference is hereby made to that application for a complete description of the coating material.

In general, a vehicle, which may be a barge or a wheeled vehicle, is provided with means for assembling short lengths of pipe and welding them into a continuous pipeline as the process proceeds and for sequentially coating increments of that pipeline over the vehicle. The apparatus includes a carriage movable on the vehicle along the pipe thereon for applying the mastic coating to the pipe. When the carriage reaches one end of its path it is clamped to the pipe and the vehicle then moved longitudinally under the pipe and carried to underlie a further uncoated portion of the pipe and the coating machine then assumes a position on the vehicle at the starting end of its coating path. The vehicle is then held stationary and the coating machine advanced therealong to coat a further increment of the pipe.

The coating machine includes mechanisms and elements adapted to merely apply a coating of the required thickness on the pipe and to support the same thereon without applying undue pressure to the material and without initially compacting the same to its maximum density. A separate compactor operable independently of the mastic applicator is movable along the same path as the applicator to radially compact the supported coating on the pipe to achieve maximum density thereof by arranging the particles of aggregate in the mastic in the most compact arrangement within the voids of the next larger particles of aggregate and to firmly bond the coating to the pipe. The machine for applying the coating material to the pipe and for compacting the same is fully disclosed and claimed in the copending application of Patrick H. Timothy and Clarence W. Shaw, Serial No. 492,931, filed March 8, 1955, and entitled "Pipe Coating Method and Apparatus," now Patent No. 2,863,204. Reference is hereby made to that application for a complete description of the coating applicator and compactor.

The coated pipe extending rearwardly and downwardly from the vehicle remains exposed to air for some time and, even though at least partially cooled by sprays, still remains somewhat soft. The present invention employs support means therefor arranged to support the coated pipe in the air without deforming the relatively soft coating and without sliding movement relative thereto during the lowering cycles when the pipe moves relatively to the vehicle. The invention includes further support means for controlling the curvature of the pipe from its coating path to maintain a curve therein tangent to that path to the desired downwardly and rearwardly extending slope and thereafter maintain the downwardly and rearwardly extending portion of the pipe, below the surface of the water, substantially straight and tangent to the curved portion down to the next to the last or next lowest support. At the latter position a transition curve must be provided to allow the pipeline to assume a gradual change from the straight downward slope to the horizontal position on bottom. In the onshore laying of pipelines from floating equipment in swamp and marsh as shown in Figs. 10 and 11 and as hereinafter explained, canals are dredged to a depth of 6 feet to provide the necessary flotation. A ditch 2 feet deep is cut in the bottom of the canal into which the pipe is laid. The bottom of the pipeline in the ditch is, therefore, 8 feet below the water surface and, hence, the curvature which a pipeline will assume under such conditions is well known or can readily be computed from observed data. In the 8 foot depths the curves are very flat due to the fact that the weight of the pipe in water is considerably less than its weight in air and the curvature has been found to be sufficiently small to permit the transition curve to conform to any increase in deflection due to the movements of the floats by wave action without causing the pipe to deflect beyond the elastic limit of the steel. This transition curve begins at the next to the last support and extends over the last support, which is maintained at a distance of about 8 feet above the bottom, and from thence the pipeline assumes the same curve to bottom as when freely suspended in a pipeline canal. On the other hand, the upper curve over the end of the barge from the horizontal coating path to the downward straight slope is given the maximum allowable deflection to make this curve as short as possible since it must be rigidly supported throughout its length and since such support requires a cantilevered truss at the end of the vehicle.

It is therefore an object of this invention to provide a pipe laying apparatus and method for laying pipe from a vehicle wherein the pipe is lowered from off an end of said vehicle without exceeding a predetermined radius of curvature in the pipe.

Another object of this invention is to provide a pipe laying apparatus and method wherein pipe is assembled on a vehicle into a continuous length, is intermittently caused to pass over an end of said vehicle and to curve downwardly, and preserving a predetermined minimum radius of curvature.

Still another object of this invention is to provide apparatus and method for laying a coated pipe wherein means are provided for supporting and intermittently lowering the coated pipe without imposing unduly concentrated pressures on the pipe coating.

A further object of this invention is to provide an apparatus and method as set forth above employing a curved trackway and movable carriage to support and guide a pipe along a curved path.

A still further object is to provide apparatus and method as set forth above, wherein the pipe is assembled on a buoyant vehicle and wherein spaced float-supported means engage and support underwater portions of the pipe providing for adjustment for different water depths.

An additional object of this invention is to provide a pipeline laying method and apparatus employing spaced float means for supporting the pipe that will permit the pipe to conform to the movements of the floats under all wave actions likely to occur without bending the pipe beyond the elastic limit of the steel.

Another further object of this invention is to provide a pipe laying method and apparatus employing a float means for supporting spaced portions of a pipe being laid and means providing for the addition or removal of floats to accommodate the apparatus to different water depths.

An additional object of the invention is to provide a method of lowering and laying pipe from a vehicle without subjecting the pipe to excessive bending stresses.

A further objective of this invention is to provide a means whereby the forward end of the pipe can be capped and readily lowered to bottom in the event it becomes necessary for the floating equipment to be moved to sheltered waters during a storm and whereby the pipe can thereafter be readily raised to permit resumption of work.

Further and additional objects and advantages of this invention will become apparent to those skilled in the art as the description proceeds in connection with the accompanying drawings, wherein:

Fig. 1 is a diagrammatic side elevational view of a barge equipped for welding pipe lengths into a continuous length of pipe, coating said pipe with the desired coating and equipped with the pipe lowering and laying means of the present invention;

Fig. 2 is a side elevational view, on an enlarged scale, of one of the floats and pipe supporting cradles of Fig. 1;

Fig. 3 is an end elevational view of the apparatus shown in Fig. 2 as viewed substantially along the broken line 3—3 of Fig. 2;

Fig. 4 is a fragmentary side elevational view on an enlarged scale, of the rearmost portion of the barge shown in Fig. 1;

Fig. 5 is a side elevational view, on a further enlarged scale, of the pipe supporting cradle shown at the right hand end of Fig. 4;

Fig. 6 is an end view of the cradle of Fig. 5;

Fig. 7 is a fragmentary sectional view taken substantially along the line 7—7 of Fig. 4;

Figs. 8 and 9 are side and end views, respectively, of a dolly or cradle employed with the present invention;

Fig. 10 is a plan view of apparatus for laying pipe along inshore waterways and incorporating many of the salient features of the present invention; and Fig. 11 is a side elevational view of the apparatus of Fig. 10.

Referring first to Fig. 1, numeral 2 indicates a buoyant barge movable in a direction along the line of pipe being laid thereby. It is contemplated that the barge normally be held in fixed position by means of spaced anchors (not shown) forwardly and rearwardly thereof and on opposite sides thereof by lines extending from suitable winches (not shown) on the barge to the various anchors. Obviously, by proper manipulation of the winches, the barge may be moved in any desired direction through any desired distance within the limits of length of the anchor lines. Obviously also, the anchors may be moved to different positions to thereby permit progressive incremental movement of the barge in the desired direction.

The barge is provided with a suitable supply rack holding a supply of lengths of pipe 4. A length of pipe 4 is held in position to be welded, at 6, to the end of a continuous length of pipe extending rearwardly of the barge and over the end thereof to the bottom of the body of water. An incomplete weld is made at 6 but sufficient to support the end length of pipe 4 until the barge is moved to the left to position the incomplete weld at station 8 where the weld is completed. At station 10 the weld is inspected by X-ray, cleaned and primed. In the event a defective weld is found, it is cut out and the pipe is rewelded. The barge is intermittently moved to the left a distance substantially equal to the length of one section 4 of pipe. The sections of connected pipe which are welded together are supported on the barge by rollers 12 to facilitate advance movement of the barge thereunder. From the station 10 the welded pipe extends rearwardly of the barge over a trackway 14 on which a carriage 16 moves. The trackway 14 is of a length about equal to the length of one section of pipe 4 plus the length of carriage 16 and compactor 20, and carriage 16 carries a mastic coating applicator 18 and a pipe supporting roller (not shown) thereon. The compactor 20 is independently movable along the trackway 14.

From the rearmost end of the trackway 14 a second but upwardly convexly curved trackway 22 is provided underlying the pipe and on which a supporting carriage or dolly 24 is movable. The barge is also provided with a cantilever trusswork 26 overhanging the rearmost end of the barge, and carrying supporting rolls 28 and a roller cradle 29. The coated pipe extends rearwardly from the compactor 20 over supporting carriage 24 to rest thereon and then over rollers 28 and cradle 29. From cradle 29 the coated pipe extends downwardly into the water onto underwater roller supports 30 suspended from spaced floats 32. Assuming the parts to be in the position shown in Fig. 1, with the barge anchor lines taut to hold the barge in fixed position, the applicator 18 is operated to apply a coating of mastic material to the pipe while moving along trackway 14 to the left. While the mastic is being applied to the pipe, a supporting wrapping is applied thereto and compactor 20 is caused to follow the applicator along the trackway and to radially compact the wrapped and coated pipe to the desired degree. The coating and wrapping continues with the barge stationary until the applicator reaches the left end of the trackway 14, whereupon the application of mastic to the pipe ceases but the applicator is not moved relative to the pipe. It is, in fact, clamped to an adjacent uncoated portion of the pipe and held clamped thereto while the anchor lines of the barge are manipulated to advance the barge to the left a distance equal to one length of pipe 4. The applicator is provided with a supply hopper of a capacity sufficient to hold at least enough mastic material to coat one length of pipe and when the applicator has reached the left end of trackway 14 its hopper is positioned under main supply hopper 34 on the barge and during the interval of time when the barge is being prepared for forward movement an additional supply of mastic material is moved from the supply hopper 34 to the hopper on the applicator.

During movement of the barge forwardly the pipe resting on carriage or dolly 24 causes that carriage to move rearwardly along curved trackway 22 in supporting engagement with the coated pipe to a position adjacent the rear end of the barge. At the completion of the forward movement of the barge, the left end of the endmost section 4 of pipe, shown in Fig. 1 as overlying the supply rack, moves to station 6 ready to receive an additional section to be welded to its end and each previous weld moves rearwardly relative to the barge to the next station. Thus uncoated sections of the pipe are sequentially positioned over the trackway 14. It will be obvious that, during forward movement of the barge, the trackway 14 is moved forwardly under carriage 16, which includes the pipe supporting roller referred to, to reposition applicator 18 and compactor 20 at the rear end of the trackway 14 for commencement of the next coating cycle. After the barge has been advanced one step, the supporting carriage 24 (then at the rear end of trackway 22) is actuated to lower its pipe-engaging saddle and to then move forwardly to the position of Fig. 1 whereupon the saddle is raised into pipe-engaging position, where it remains during the coating cycle.

A series of spray devices 36 are arranged along the trackway 14 and movement of carriage 16 along the trackway operates to activate those spray devices sequentially to spray a coolant on sequential increments of coated pipe after the coating has been applied thereto and wrapped. The spray devices are, as stated, sequentially operated as the coating machine advances to the left but are sequentially "shut off" as the barge is moved forwardly past the applicator 18 so that coolant is not sprayed on the applicator 18 itself or on uncoated portions of the pipe. A spray system 37 is also arranged to continuously spray the coated pipe overlying trackway 22 and extends rearwardly from the barge to about the position where the pipe enters the water.

That portion of the apparatus shown in Fig. 1 and comprising the curved trackway 22, dolly 24, trusswork 26, roller supports 28 and 29, floats 32 and cradles 30 constitute the principal subject matter of the present invention and their structure and mode of operation will now be described in greater detail.

As will be obvious from Fig. 1, the pipe extends along a substantially straight horizontal path over the barge to a point beyond the position of the coating machine where it bends or deflects downwardly and rearwardly over the rear end of the barge to become again tangent at a point above the water surface to a line extending substantially straight to a position near bottom where the pipe again bends with a flat sweeping curve to a point of tangency with the substantially horizontal portion of the pipe lying on bottom. The apparatus of this invention provides means for maintaining the curvature, within allowable limits, of the curved portion of the pipe in air over the rear end of the barge and of conveying the pipe below water to its position on bottom, regardless of the depth of water or the height of the waves, without bending the pipe beyond allowable limits of the steel. As previously indicated, means are provided on the barge for supporting the straight horizontal portion of the pipe in the desired position and those means include a roller support on the carriage 16 movable with that carriage along trackway 14. Thus, during the coating cycle, support for the pipe 4 moves from the right hand end of trackway 14 to the left hand end thereof. Since the pipe being coated is of substantial diameter and since it acts as a continuous beam over interior supports when welded together, lengths equivalent to a single length thereof are substantially completely rigid and may be supported at such distances without undue flexure. Thus, it is possible to space the supports at least a full individual pipe-length apart but it is desired that that spacing be not exceeded materially. Furthermore, to preserve the desired tangency between the straight horizontal portion and the downwardly curved portion, it is desirable that support be at all times provided for the pipe closely adjacent the point of tangency. During the pipe-coating cycle, the dolly 24 provides that support and during the interval of time when the roller support on carriage 16 is moving to the left. When the carriage 16 is at the right end of trackway 14 its roller may be relied on to provide pipe support near the point of tangency referred to. It is also permissible to move the dolly downwardly of the curved portion of the pipe simultaneously with movement of the carriage 16 toward the right end of trackway 14 since the span between those supports does not materially exceed one pipe-length and sag in the pipe in that span would not materially alter the point of tangency.

Referring now to Fig. 4, the rearmost end of the barge 2 is shown as provided with the trackway 22 which is upwardly convexly curved in a fore-and-aft direction along a path substantially parallel to the desired curvature of the pipe 4. The trackway 22 extends from a position somewhat forwardly of the rear end of the barge to a position extending rearwardly of that end where it is supported by the cantilever trusswork 26, and particularly a lower portion 38 thereof. In order to reduce the length of the cantilever truss at the end of the barge to the maximum extent, the pipe should attain the desired downward slope over the shortest possible path. Accordingly, a circular path of the minimum permissible radius is used. As this curve is very flat, a parabola may be used to determine critical points of both the pipe 4 and trackway 22. For this purpose a parabola having a minimum radius of curvature of 400 feet is used which will accommodate pipes of 16 inches in outside diameter and less without excessive bending. The trusswork 26 may take any desired form, that shown in the drawings being merely illustrative. The trusswork 26, however, should extend rearwardly of the barge sufficiently far to support the roller cradle 29 at about the point of tangency between the curved portion of the pipe and the downwardly sloping straight portion. Usually, and preferably, that point of tangency is quite close to the surface of the body of water in which the pipe is being laid so that the maximum distance from the cradle 29 to the first underwater roller support 30 will not become excessive.

Referring now to Figs. 8 and 9, the dolly 24 is shown as comprising a carriage portion 40 mounted on rollers or flanged wheels 42 which, in turn, are supported and guided by rails 44 constituting the trackway 22 of Figs. 1 and 4. The carriage 40 may be provided with a suitable traction motor 46 and power transmission means comprising a sprocket wheel 48 driven by the motor 46, sprocket chain 50 trained over sprocket wheel 48, and a sprocket wheel 52 fixed to the axle 54 of a pair of the flanged wheels 42. The transmission further includes a selectively operable clutch 56 for disengaging the motor 46 from the axle 54 or engaging the same thereto in driving relation. The clutch 56 may be of any suitable type but is preferably susceptible to remote control whereby it may be engaged or disengaged at will by an operator at a central control station on the carriage 16 of the coating machine 18. The particular means or devices for exercising such remote control of the clutch 56 form no part of this invention but many suitable forms thereof will be readily apparent to those skilled in the art.

The dolly carriage 40 is provided with a hydraulic or pneumatic cylinder 58 fixed thereon and in which a piston or plunger 60 is vertically movable. At its upper end, the plunger 60 has mounted thereon a cradle or saddle member 62. The saddle 62, even though engaging the pipe 4 at a curved portion thereof, need not be longitudinally curved since the deviation of a relatively short portion of the pipe from a straight line is so minute within the dimensions of the cradle 62 that it may be treated as substantially straight. By way of example, the cradle 62 may be of the order of 3 feet in length for supporting a pipe of 12¾ inches O.D. and having a mastic coating thereon of about 1 to 1½ inches in thickness. The cradle 62 is, however, transversely curved to upwardly concave form, as clearly seen in Fig. 9 and to such curvature that it is complementary to the outer surface of the coated pipe 4. Thus, the pipe 4 is supported on the cradle 62 by contact therewith over a very substantial and extensive surface area. It is to be remembered that the dolly carriage 40 and cradle 62 remain stationary at the left end of trackway 22 in supporting relation to the coated pipe during the interval of time required for the coating machine 18 to coat a full length of the pipe. The cradle 62 furthermore engages and supports that portion of the coated pipe to which the hot mastic coating was most recently applied and which has, therefore, had the least time to cool and harden. It has been found that a cradle of the general relative proportions indicated above will not cause any substantial deformation of the coating during the time it is in supporting contact therewith.

The hydraulic lift means comprising the cylinder 58 and plunger 60 may be selectively controlled by any suitable means (not shown) which likewise are preferably under the control of an operator on the carriage 16 whereby the operator may, at will, raise the cradle 62 in supporting relation to the pipe 4 or lower the same out of engagement therewith.

In operation, the dolly 24, comprising carriage 40 and cradle 62, are left stationary in the position indicated in Fig. 1 during an entire coating cycle by the mechanism 18. When the barge 2 is being moved forwardly in the manner previously described, the clutch 56 is disengaged whereby frictional contact between the pipe and the cradle 62 causes carriage 40 to remain stationary with respect to the pipe and permit the barge and tracks 44 to move forwardly under the carriage 40. The saddle or cradle 62 thus supports a curved portion of the pipe 4 at a fixed position thereon during movement of the curved portion along the curved path extending downwardly and rearwardly toward the water. In other words, a fixed portion of the pipe adjacent the upper tangent is vertically supported during movement of the barge and is lowered generally vertically in timed relation to barge movement to cause that portion of the pipe to flow the desired curved path relative to the barge.

When the barge has been moved forward one step the dolly 24 arrives at substantially the position shown by dotted line at 64 in Fig. 4 and at the same time the roller support on carriage 16 has reached the right hand end of trackway 14. A roller support 28 is mounted on the trusswork 38 closely adjacent the position 64 and its distance from the pipe support roller on carriage 16 is well within the maximum spacing. Thus, the cradle 62 may be lowered out of contact with pipe 4 and motor 46 and clutch 56 actuated to cause the carriage 40 to move from the dotted line position of Fig. 4 to the full line position thereof. Thereupon the clutch may be disengaged by the operator and the hydraulic mechanism actuated to lift the cradle 62 into supporting relation to the pipe for the commencement of the next pipe-coating cycle.

Even though the barge is provided with spray means 37 extending outwardly along the trusswork 26 to continually cool the coating on the pipe, it is desirable that all portions of the pipe above the body of water be supported in such manner as to minimize the danger of distorting the coating. It is to be remembered that coatings of the type contemplated cool and harden rather slowly. For this reason, the rollers 28 providing support for the coated pipe between the position 64 and the rear end of the cantilever trusswork, are designed to offer support without highly concentrated pressures. Each of the roller devices 28 comprises a pair of pneumatic-tired wheels 68 (Fig. 7) journalled on any suitable support 70 carried by trusswork 38 but are preferably so arranged that they rotate in upwardly converging planes whereby they may simultaneously engage the coating on a pipe 4 to offer not only vertical but some lateral support. The wheels 68 may be low pressure airplane wheels so as to engage the pipe 4 over a very substantial surface area, due to distortion of their resilient peripheries, and thus distribute the supporting force sufficiently to avoid distortion of the coating on the pipe.

At the rearmost end of the cantilever trusswork 26 (Fig. 4) a roller cradle 29 is provided, which may be suspended from the trusswork by a cable 72 or the like.

Reference is now made to Figs. 5 and 6 wherein the cradle 29 is shown in greater detail. The showing of Figs. 5 and 6 is principally schematic and illustrates the major features of the cradle 29 without attempting to show all details of construction, which may be varied within wide limits by those skilled in the art. The cradle 29, however, preferably includes a plurality of transverse rollers 74 journalled in a lower framework 76. Removably secured to the framework 76 are upwardly extending rods 78 on which side rollers 80 are journalled. The side rollers 80 are laterally spaced a distance substantially greater than the diameter of the coated pipe 4 and merely prevent undue lateral movements of the pipe on rollers 74. The rods 78 are secured at their upper ends to an upper framework 82 on which a further roller 84 is journalled for a purpose to be described later. A suitable cable sling 86 may provide a supporting communication between the cradle 29 and cable 72. The rollers 74 of cradle 29 and the roller devices 28, previously described, are arranged to support spaced portions of that part of pipe 4 which extends along the curve previously referred to with cradle 29 substantially at the point of tangency between the curved portion of the pipe and the straight downwardly and rearwardly extending portion, to be referred to in more detail hereinafter. Since the pipe lowering apparatus described in this embodiment is intended for lowering a pipe from the barge into a body of water, every precaution must be taken to minimize the danger of damage to the apparatus and pipe by waves which may occur at the surface of the water. The roller devices 28 are mounted sufficiently high above the water surface to be substantially clear of any waves that might be encountered. The cradle 29, however, is preferably located quite close to the water surface and is, therefore, subject to battering by waves. It is for this reason that the smaller rollers 74 and 80 are employed and mounted in a relatively open framework to thus minimize impact forces caused by waves that might impinge on the cradle.

As previously described, the downwardly and rearwardly sloping portion of the pipe 4 below the water is preferably substantially straight and supported at spaced intervals by the roller cradles 30 suspended from floats 32. The floats 32 are all identical and may take the form shown in Figs. 2 and 3 wherein sealed generally cylindrical tanks 88 constitute the buoyant means and a suitable superstructure 90 is welded thereto to support a platform 92 above the surface of the water. Mounted on platform 92 is a suitable winch 94. The winch 94, although shown as a hand-operated winch, will not be described in detail since any winch device, whether it be hand-or power-operated, may be employed. The only requirement is that the winch be of sufficient capacity to support and manipulate the cradle 30 together with the weight of pipes 4 and 124.

As previously described, the pipe 4 is provided with a thick heavyweight coating to insure that it sinks in the water. For reasons of economy, the coating is not applied in any substantial excess beyond that required to sink and stabilize the pipe and the submerged pipe, therefore, weighs considerably less than it does in air. For example, the pipe may be coated to such thickness that the resulting structure has a specific gravity of about 1.25 and the submerged pipe would thus weigh only ⅕th as much as it does in air. It can thus be seen that the winch 94 need not be so powerful as to support and manipulate the pipe 4 in air.

Whatever form of winch 94 is used, it will have a winch drum 96 on which a cable 98 is wound. The cable 98 extends downwardly through a suitable opening 100 in the platform 92 to a sling 102 secured to a framework 104. The framework 104 includes U-bolts 106, for a purpose to be described later, and generally U-shaped brackets having depending legs 108. Each of the legs 108 is removably secured to a corner portion of an open framework 110, which may be identical in construction to the framework 76 of Figs. 5 and 6. The framework 110 rotatably mounts rollers 112 for engaging and supporting the pipe 4. The depending legs 108 rotatably mount side rollers 114 corresponding to the rollers 80 of Figs. 5 and 6 and performing the same function.

As is evident from Fig. 1, the floats 32 and cradles 30 are spaced rearwardly of each other and from the barge to support the cradles 30 at predetermined positions along the length of the pipe 4. That spacing must be preserved to insure that the portion of pipe 4 supported thereby does not deviate substantially from a straight line having a predetermined slope. A cable 116 extends between each pair of adjacent floats 32 and is removably secured to each. The foremost float 32, nearest the barge 2, has a cable 118 removably secured thereto (see also Fig. 4). The cable 118 extends forwardly from the foremost float over a sheave 120 journalled on the trusswork 26 and then downwardly to one drum of a winch 122 on the barge 2.

A spacer pipe 124 extends along the pipe 4 and below each of the upper frames 104 of the cradles 30. The spacer pipe 124 may bear against transverse blocks 126 on the frames 104 and be secured in fixed position against those blocks by means of the U-bolts 106 previously described. The spacer pipe 124 may be a relatively small diameter metal tubing comprising individual short sections joined together by sleeve couplings 128. Since the spacer pipe 124 is securely clamped to each of the cradles 30, those cradles are, therefore, positively held in a fixed and predetermined distance apart along the length of the pipe 4. Furthermore, it is necessary that each cradle be kept substantially vertically below its corresponding float and be prevented from sliding along the pipe. Neglecting the friction of the rollers, the cradle will not slide up the pipe if the thrust in the spacer pipe 124 against the framework 104 equals the component along the pipe of the tension in the cable 98 due to the weight of the pipe 4. An analysis of the forces acting on the cradle 30 shows that the spacer pipe 124 will thus prevent the cradle from sliding if the submerged weight of the spacer pipe 124 exceeds the submerged weight of the coated pipe 4. In order that the spacer pipe 124 can develop the maximum submerged weight, each section of the spacer pipe is provided with an opening, such as shown at 130 in Fig. 2, to admit water to the interior of the pipe and to impart a negative buoyancy to the spacer equal to the weight of the steel less the weigh only of the water displaced by the steel itself. The tangential component of the stress in the cable due to the weight of the pipe 4 which tends to pull the cradle up the pipe 4 is resisted by the thrust in the spacer pipe. Since the length of the spacer pipe 124 is considerably longer from the clamp 132 in Fig. 4 to the first submerged cradle 30 than the length necessary to offset the component along the pipe of the stress in the cable 98 due to the weight of the pipe 4 on the first cradle 30, the spacer pipe 124 is in tension at the clamp 132. Hence, the spacer pipe 124 not only keeps the cradles at a fixed distance apart but it is given the necessary weight to offset the tendency of the cradles to move up the pipe 4 when positioned vertically below the corresponding floats and can always be held at its upper end by the cable 136, Fig. 4, when the clamp 132 is opened.

Referring now to Fig. 4, the spacer pipe 124 extends upwardly and forwardly from the foremost cradle 30 and upwardly into the trusswork 26 on barge 2. The foremost section of the pipe 124 is also provided with a sleeve coupling 128 at its forward end and the barge 2 is provided with a suitable releasable clamp 132 engageable with the pipe 124 immediately behind the foremost sleeve coupling 128. If desired, the clamp 132 may be hand-operated to release or clamp the pipe 124. The foremost coupling sleeve 128 has a block or plug 134 screwed or otherwise secured therein, which block is, in turn, secured to a cable 136 extending over a sheave 138 and from there to another drum of the winch 122 previously referred to.

By providing the cables 116 between the floats 32, the cable 118 between the foremost float and the barge, the spacer pipe 124 secured to each of the cradles 30, and the clamp 132 for securing the pipe 124 to the barge, it is obvious that the floats 32 cannot move rearwardly relative to each other or the barge and cannot become materially displaced from a position directly over their respective cradles 30. The pipe 124 fixedly holds each cradle 30 in a predetermined position relative to the barge 2 and the surface of the water and, therefore, predetermines and maintains the straight line slope of the pipe 4 which is tangent to the upper curved portion thereof previously described.

The number of floats 32 and cradles 30 employed and the length of the spacer pipe 124 is determined by the depth of the water in which the pipe is laid. The floats and cradles must be provided in sufficient number to offer the underwater portion of the pipe adequate support for a sufficient distance rearwardly of the barge and to a sufficient depth below water that the last support is maintained at a distance of approximately 8 feet above the bottom of the water. Thus, as pipe laying proceeds, the depth of the water may increase or decrease, necessitating the addition or removal of one or more floats 32 and cradles 30. The jointed nature of the spacer pipe 124 permits ready removal or addition of floats and cradles when desired. It also permits adjustments in the cradles for variations in depth corresponding to the length of the individual sections of the spacer pipe. These adjustments are also accompanied by corresponding adjustments in the winch cables 98 and in the cable 118 extending from the barge to the first float 32.

When a decrease in depth corresponding to the vertical projection of an individual section of the spacer pipe has occurred, the cradles are first moved simultaneously toward the barge by the winch 122 which is operated to draw in both cables 136 and 118 simultaneously but at different rates. Of course, before the cables are drawn in, the clamp 132 must be loosened to free pipe 124 from the barge. As previously stated, the cables 118 and 136 are wrapped on different drums of the winch 122 and that winch may be of any desired design but preferably so constructed that the two drums rotate at different speeds whereby the cable 136 is drawn in or paid out at a rate different from that of cable 118. It is necessary that the floats 32 be at all times substantially directly over their corresponding cradles 30 and when the cables are drawn in as described, the cradles 30 move along an upwardly inclined path of greater length than the corresponding horizontal path that must be travelled by the floats 32. The winch 122 is designed to draw in the cables 118 and 136 at the required relative rate. During the drawing in of the cables as described, the floats and cradles move forwardly relative to the barge and so this operation will always be performed during a time when the barge is stationary. Since the adjustments in depth corresponding to the individual sections of the spacer pipe 124 are quite small and generally correspond to a change of only about 2 feet in depth, it is not necessary that the winches 94 on the floats 32 be operated to raise the cradles 30 simultaneously with the drawing in of the cables 118 and 136 in order that the cradles be raised in timed relation with their forward advance. This slight deflection of the pipeline 4 can be readily absorbed in the straight length extending from the fixed cradle 29 and over the first submerged cradle 30. Accordingly, the floats can be adjusted successively beginning with the forward float after the cables 118 and 136 have been drawn in. It should be borne in mind that pipe cannot be welded and work carried on during rough weather. Hence, laying operations will not be undertaken in periods of excessive wave action. The resulting vertical displacements between interior supports corresponding to successive adjustments in the winches 94 and the cables 98 can likewise be readily absorbed in the corresponding sections of pipe 4 until all adjustments of the winches 94 have been made.

After the cables 118 and 136 have been drawn in a distance corresponding to the length of one section of pipe 124, the next succeeding collar 128 of the spacer pipe is positioned forwardly of the clamp 132 whereupon the clamp may be actuated to securely grip the pipe and permit removal of the forwardly extending section of pipe 124 and resecurement of the cable 136 to the shortened pipe.

With increasing depths, it is obvious how adjustments can be made by reversing the process described but it must be borne in mind that, while the cables 118 and 136 are drawn in during periods when the barge is stationary, the cables 118 and 136 are paid out while the barge is moving forwardly to thus increase the spacing between the plurality of floats and the barge.

When the upper portion of the foremost cradle 30 is positioned at about the water line as laying progresses in decreasing depths, it is disassembled and removed from the pipe 4 and the spacer pipe 124. At the same time the cable 118 is secured to the next succeeding float 32 whereupon the foremost float and cradle may be completely removed and separated from the apparatus along with the short cable 116 associated therewith.

With increasing depths, additional floats and cradles are inserted when the foremost float 32 has reached a distance equal to the prescribed interval between floats from about the point where the spacer pipe enters the water and where an additional cradle can readily be inserted and assembled at the prescribed interval between floats by the reverse process described above.

The roller 84 on the cradle 29 (Fig. 5) is positioned to engage and support the spacer pipe 124 and provides for relative longitudinal movement between the spacer pipe and the barge during the operations just described.

The apparatus heretofore described and the steps outlined in operation thereof have been described in general terms and it will be obvious to those skilled in the art how to calculate the various dimensions and relative sizes of the parts for the particular pipes desired; however, by way of example, and assuming the pipe being laid to be of 12¾ in O.D. coated with the weighted mastic heretofore referred to, the curved portion of the pipe extending downwardly and rearwardly of the barge may be supported in such a way as to have a minimum radius of curvature of about 400 ft. without necessitating excessive rearward projection of the trusswork 26.

The curve is continued downwardly and rearwardly to the cradle 29 where it becomes tangent to the extension of the underwater portion of the pipe at a slope of 20 ft. in 100 ft. In such a case the floats 32 will be spaced apart a distance of about 50 feet on centers and the corresponding length of the spacer pipe 124 will be 51 feet from center to center of the cradles. Enough floats and cradles 30 are provided to support the pipe to extend downwardly to such a point that the rearmost cradle 30 is about 8 ft. above the bottom of the body of water. The next to the rearmost cradle 30 is also preferably about 8 ft. higher than the rearmost cradle and is approximately at the point of tangency of the straight sloping section with the transition curve previously described which extends over the rearmost cradle to become freely suspended until it reaches bottom approximatey 150 feet from the rearmost cradle. This curve is identical with that assumed by a similar pipe when laid by the method shown in Fig. 10 and has a minimum radius of curvature of about 1600 feet for the 12¾ inch pipe. This small curvature will permit the transition curve to conform to increased deflections due to vertical movements of the floats under wave action without stressing the steel of the pipe beyond allowable limits.

By supporting the underwater portion of the pipe to extend along a substantially straight slope from which it is freely suspended over a very flat curve to bottom, considerable movement of the floats 32 and cradles 30 is permitted without unduly stressing the pipe. In other words, the floats and cradles may rise or fall, due to wave action, as much as 2 ft. in either direction from their normal relative positions without bending the pipe 4 beyond the desired minimum radius of curvature. For this reason, it is also possible to lengthen or shorten the cables 118 and 136, as the depth of the water changes, in increments corresponding to a 2-foot vertical displacement in the depths of each of the cradles 30 without necessitating simultaneous adjustment of the winches 94 to lengthen or shorten the cables 98 the two feet in timed relation to the movement of the cables 118 and 136. Since the preferred slope of the straight line portion of the pipe is 2 ft. in 10, the permissive horizontal displacement of the floats at each adjustment is 10 ft. A horizontal displacement of 10 ft. of the floats results in a displacement of the cradles 30 along the slope a distance of about 10.2 ft. Thus, each section of spacer pipe 124 may be 10.2 ft. long and constitute a unit of adjustment.

A further feature of this invention resides in the designed spacing of all pipe supports positioned in air so as to offer the minimum danger of distorting the pipe coating. While it is true that the coating is sprayed with a coolant after application to the pipe and until it enters the water, it is to be remembered that the coating is applied very shortly after sections of the pipe have been welded together. The points at which the welds occur remain quite hot for several inches on each side of the weld and are considerably hotter at the time the coating is applied than the remainder of the pipe. Thus spray cooling of the coated pipe may chill and solidify the outer surface of the coating immediately, yet the heat in the areas of the weld will be largely transmitted outwardly through the coating and again partially soften the outer surface even after some cooling. All of the pipe supports are so spaced and arranged that none of them is directly under a pipe weld during the interval of time when the barge and pipe are stationary relative to each other. By reference to Fig. 4, letter "A" indicates the position successive welds assume over the trackway 22 when the pipe and barge are both stationary, and it will be seen that this position is well displaced from the carriage or dolly 24 and is not over any other roller support for the pipe. The next rearmost weld is rearwardly of the cradle 29 and thus neither the roller devices 28 nor the cradle 29 ever come to rest below a weld. While this feature is of particular importance in the handling of recently-welded pipe coated with a heat-responsive mastic, it is also applicable to pipes being laid without such coating since the heat of the weld of even a bare pipe could damage the permanent supporting structures and/or rollers on the pipe laying equipment.

The description hereinabove has been with reference to the laying of pipelines in a body of water of substantial depth. Such conditions are usually encountered only in gulfs, bays, lakes, offshore areas of the ocean and the like. It is often necessary, however, to lay comparable pipelines through swamp or marsh areas or shallow water, referred to hereinafter as "onshore" pipelines. When distances are short, a shallow trench may be dug and the line pushed in on floats and then sunk in position. In the latter method the line is generally assembled by successive joints at one end. For long distances a canal is dug of sufficient width and depth to permit the use of floating equipment to assembled and lay the pipeline. These pipeline canals are generally 40 feet wide with a minimum depth of 6 feet. A trench is excavated in the bottom of the canal to a depth exceeding the overall thickness of the pipeline so that the top of the coated pipe will lie below the bottom of the canal when laid in this trench to protect the pipe from being struck by craft using the canal. In laying onshore pipelines under water the problems of sinking the pipe and holding the pipe stable on the bottom still remain and it is still necessary to handle the pipe during laying in such manner as not to damage the coating and to avoid bending the pipe beyond the allowable limits of the steel.

Figs. 10 and 11 illustrate the adaptability of the present invention to onshore pipe laying equipment. Two relatively narrow and shallow draft barges are hinged together to form the lay barge 150 to which two auxiliary barges are moored, one forward principally for bare pipe (not shown) and one barge 164 aft which carries coating material and other supplies. The trench 152 is dug in the bottom of the canal for receiving the pipe as previously explained.

Since the depths to which the pipe is to be lowered seldom exceed 18 ft., it is not necessary to provide a plurality of the floats 32 and cradles 30 employed with the previous embodiment. In the embodiment of Figs. 10 and 11, the lay barge 150 may be provided with a pipe coating machine 154 identical to that described in connection with the previous embodiment and mounted on a trackway 156 on the lay barge 150. Since all operations must be performed in a much narrower space, the main supply hopper 158 for mastic is preferably mounted near the rear of the barge and mastic is supplied thereto from mixing or storage containers 160 by means of suitable conveyors 162. One or more of the containers 160 may be mounted on the auxiliary barge 164, narrower than the barge 150 and extending rearwardly therefrom at one side thereof. The barge 164 is located laterally of the path of the coated pipe 4 which extends downwardly and rearwardly from the rear end of barge 150. The barge 150 is provided with a cantilever trusswork 166, similar to that previously described, and which supports a curved trackway 168 corresponding to the trackway 22 of the previous embodiment. A cradle or dolly 170 which may be identical to that previously described, rides on trackway 168 to support the the pipe 4 along its curved portion and rollers 172, like those of Fig. 7, support the pipe 4 at the rearmost end of the cantilever trusswork 166.

Pipeline canals may intersect waters subject to wind as well as lunar tides which will cause periodic increased depths in the canals. Furthermore, the depths of the intersecting waterways may be considerably greater than the depth within the canal. Accordingly, provision must be made for onshore laying in depths greater than 8 feet. As in the case of the offshore barge, the curve forward of roller 172 has the minimum allowable radius of curvature of the pipe and becomes tangent to a straight downwardly sloping line at approximately roller 172. The slope of this straight line is the same as the slope at the cradle 174 of the freely suspended line from the cradle 174 to bottom for the 8-foot depth and it is, therefore, tangent to the curve extending to bottom at the cradle 174. When the depth of water increases, the distance from the cradle 174 to the point of contact of the pipe with bottom as well as the slope of the curve to bottom at the cradle 174 both increase. By lowering the cradle by means of the winch 176, the slope of the line from the roller 172 to the cradle can be increased at the cradle so as to remain the same as or tangent to the curve to bottom at the point where the latter curve leaves the cradle. Obviously in depths greater than 8 feet the line from the roller 172 to the cradle 174 is no longer a straight line and approaches the same curvature as the curve extending forwardly of roller 172. The maximum depth in which pipe can be laid by this method is reached when the cradle is lowered to a position when the curve from the roller 172 to the cradle 174 attains the minimum allowable radius of curvature or when it becomes an extension of the same curve as that forwardly of roller 172. In general, the limiting depth in which the pipe can be laid or the cradle lowered, is determined by the limiting deflection permissible in the freely suspended pipe between the cradle and the bottom. This deflection, of course, increases as the distance between the cradle and the point of contact with bottom or the length of the freely suspended pipe increases. By way of explanation, it is again assumed that the trackway and cantilever truss extending over the rear end of the barge is designed to accommodate pipe up to and including 16 inches outside diameter. The curve forwardly of roller 172 is, therefore, a circle (or parabola) having a radius of curvature of 400 feet. It will also be assumed that we are laying 12¾ inch pipe weight coated to give a specific gravity of 1.25. When laid in the 8-foot depth and freely suspended, this line assumes a curve having a slope of approximately 1 ft. in 10 at the surface of the water. The straight line from roller 172 to the cradle 174 must, therefore, have a slope of 1 ft. in 10. Accordingly, the roller 172 is positioned on the truss at a point where the tangent to the circular curve forwardly of the roller 172 has a downward slope of 1 ft. in 10. The corresponding position of the cradle is the point where this straight slope meets the water surface. As depths increase the cradle can be lowered until it reaches a point on the circular curve having a 400-foot radius. In Fig. 10 this amounts to lowering the cradle two feet and at that position the slope of the tangent at the cradle would become 1 foot in 5. In this case the point of contact of the pipe with bottom would increase in length from about 150 feet from the cradle to approximately 200 feet from the cradle and the cradle would be 20 feet above bottom instead of 8 feet. Since the cradle is 2 feet below the surface and the bottom 20 feet below the cradle, the maximum depth in which the 12¾ inch pipe could be laid by this method would be 22 feet. However, since the deflection of the freely suspended pipe increases with the suspended length, the strength or section modulus of the pipe will ordinarily not permit a 12¾ inch pipe to span the 200-foot length. This section modulus will ordinarily limit the depth in which the pipe can be laid by this method to 12 and possibly 18 feet. When laying in greater depths becomes necessary, the straight sloping line from the roller 172 can be extended below bottom by use of floats as explained for offshore laying in deep water.

The support 174 is shown as a cradle which may be identical to the cradles 30 of the previous embodiment, suspended by a suitable winch 176 from the auxiliary barge 164 at the rear end thereof and extending laterally over the side of the barge to position the cradle 174 around the pipe 4. In this form also it will be noted that the welded joints of the pipe 4, indicated by letter "A," do not rest, when the barges are stationary, directly over any of the pipe supporting devices.

The pipe welding and coating processes contemplated in this embodiment are identically those previously described but the method of intermittently advancing the barge forwardly under the pipe need not be the same. It is customary in the laying of pipe from such onshore barges as shown to intermittently advance the barge along its channel by winch means on the barge acting against the pipe itself. Thus, a suitable removable cap (not shown) may be provided for placement over the free end of the pipe on barge 150 and connected by cables to a winch and/or cathead power device. Thus the winch, located rearwardly of the end of the pipe, may be actuated to pull rearwardly on the cap and thus cause the barge 150 to advance. Thereafter the cathead may be employed to move the pipe cap forwardly in position to engage the end of the next welded section of pipe for repeating the barge-advancing cycle. This method of advancing the barge is not shown in detail herein because it is well known and familiar to those skilled in this art.

While a limited number of specific embodiments of the invention have been shown and described herein, it is to be understood that they are merely illustrative and not limiting. The invention is intended to cover all modifications or equivalents falling fairly within the scope of the appended claims.

I claim:
1. In pipe laying apparatus; a vehicle having means for supporting a portion of a continuous pipe longitudinally thereover; a rearwardly and downwardly sloping upwardly convex trackway at the rear of said vehicle; said pipe supporting means including a pipe support movable longitudinally on said vehicle forwardly of said trackway and further pipe supporting means fixed on said vehicle adjacent the rear end of said trackway; and a laterally stable carriage movable along and supported on said trackway, said carriage having pipe support means selectively movable thereon into position to engage and help support said pipe or to a retracted position free of said pipe, said sloping trackway being arranged parallel to said pipe so that said carriage may support said pipe at all positions of said carriage along said trackway when said selectively movable means is in pipe-engaging position, said selectively movable means on said carriage comprising an upwardly concave cradle element mounted for vertical movement on said carriage, and selectively operable means for driving said carriage along said trackway in at least the forward direction.

2. In pipe laying apparatus, a vehicle having means for supporting a portion of a continuous pipe longitudinally thereover; a rearwardly and downwardly sloping upwardly convex trackway at the rear of said vehicle; said pipe supporting means including a pipe support movable longitudinally on said vehicle forwardly of said trackway and further pipe supporting means fixed on said vehicle adjacent the rear end of said trackway; and a laterally stable carriage movable along and supported on said trackway, said carriage having pipe support means selectively movable thereon into position to engage and help support said pipe or to a retracted position free of said pipe, said sloping trackway being arranged parallel to said pipe so that said carriage may support said pipe at all positions of said carriage along said trackway when said selectively movable means is in pipe-engaging position, said trackway being curved upwardly convex in a fore and aft direction substantially parallel to the curved portion of a pipe thereover extending horizontally over said vehicle and then downwardly and rearwardly therefrom, said further pipe supporting means comprising fixed longitudinally spaced pairs of pneumatic-tired wheels, the wheels of each pair arranged to rotate in upwardly converging planes and adapted to jointly support a pipe on their upper resilient peripheries; said pairs of wheels being spaced longitudinally of said vehicle and arranged on a curve to engage and support said curved portion of said pipe.

3. In a pipe laying apparatus, a buoyant barge on a body of water and having means thereon for supporting a pipe longitudinally thereover, said means being arranged to support and guide a pipe for longitudinal movement relative to said barge along a horizontal path thereover and a predetermined fixed curved path extending downwardly and rearwardly from the rear end thereof; float means on said body of water and spaced rearwardly of said barge, means holding said float means in predetermined spaced relation to said barge, roller means suspended from said float means for movably supporting said pipe for longitudinal movement along a further path extending downwardly and rearwardly from said curved path to a position adjacent the bottom of said body of water.

4. Pipe laying apparatus as defined in claim 3 wherein said roller means are positioned at such relative depths that a pipe mutually supported thereby extends along a substantially straight path extending to said position.

5. Pipe laying apparatus as defined in claim 3 wherein said float means comprise a plurality of longitudinally spaced floats and spaced roller members suspended, respectively, from said floats, and means for selectively changing the depth of suspension of said roller members from their respective floats.

6. Pipe laying apparatus as defined in claim 3 wherein said float means comprise a plurality of longitudinally spaced floats and spaced roller members suspended, respectively, from said floats, and spacer means extending between said roller members and to said barge for maintaining a predetermined spacing between said roller members along said further path and between said roller members and said barge.

7. Pipe laying apparatus as defined in claim 6 wherein said spacer means comprises a substantially rigid elongated member releasably secured to said barge and to each of said roller members, said elongated member further comprising releasably joined sections whereby the number of floats and the spacing thereof from said barge may be selectively varied.

8. Pipe laying apparatus as defined in claim 7 including a first cable, means for releasably securing said cable to said elongated member, a winch device on said barge for drawing in or paying out said cable, said means for holding said float means in spaced relation to said barge comprising a second cable arranged to be drawn in or paid out by said winch device, said second cable extending to the foremost float and being releasably attached thereto, further cable means extending between and releasably secured to each pair of adjacent floats, said winch device being arranged to draw in or pay out said cables simultaneously but at different rates whereby said first cable and elongated member may be moved along said further path faster than said floats are moved horizontally, to maintain said roller members directly below their respective floats at all times.

9. In a method of laying a continuous length of pipe from a movable vehicle afloat in a body of water, the steps of; positioning said pipe so that a first portion thereof extends longitudinally over said vehicle along a substantially straight line, so that a second portion extends downwardly and rearwardly from the rear of said vehicle along an upwardly convex curve, tangent to said straight line and in fixed relation to said vehicle and so that a third portion extends downwardly and rearwardly along a tangent to said curve; buoyantly supporting said pipe along said straight line and downwardly tangent portions at a plurality of spaced positions horizontally fixed relative to said vehicle and maintaining the lowermost of said positions spaced above the bottom of said body of water whereby a fourth portion of said pipe extending to said bottom hangs in an upwardly concave curve of relatively long radius and tangent to said third portion, supporting said pipe at a further position adjacent the forward upper end of said curve, said further position being fixed relative to said pipe; moving said vehicle and plurality of spaced positions forwardly relative to said pipe a predetermined distance, simultaneously lowering said further position relative to said vehicle in timed relation to movement of said vehicle to cause said further position to follow said curve, stopping movement of said vehicle, and repeating said steps.

References Cited in the file of this patent

UNITED STATES PATENTS

| | | |
|---|---|---|
| 1,569,764 | Lockwood | Jan. 12, 1926 |
| 1,871,034 | Boucherot et al. | Aug. 9, 1932 |
| 2,215,460 | Childress | Sept. 24, 1940 |
| 2,279,340 | Postlewaite | Apr. 14, 1942 |
| 2,396,614 | Somes | Mar. 12, 1946 |
| 2,613,788 | McLaughlin | Oct. 14, 1952 |
| 2,735,270 | Collins | Feb. 21, 1956 |
| 2,783,027 | Gilbert | Feb. 26, 1957 |

FOREIGN PATENTS

| | | |
|---|---|---|
| 1,055,305 | France | Oct. 14, 1953 |